Jan. 20, 1931.                F. D. POWELL                 1,789,839
                STAND FOR VISIBLE INDEX AND RECORD EQUIPMENT
                     Filed Oct. 17, 1929      2 Sheets-Sheet 1

Witness:
Stephen F. Debora

Inventor:
Frank D. Powell
By Frank L. Belknap
Atty.

Jan. 20, 1931.  F. D. POWELL  1,789,839
STAND FOR VISIBLE INDEX AND RECORD EQUIPMENT
Filed Oct. 17, 1929  2 Sheets-Sheet 2
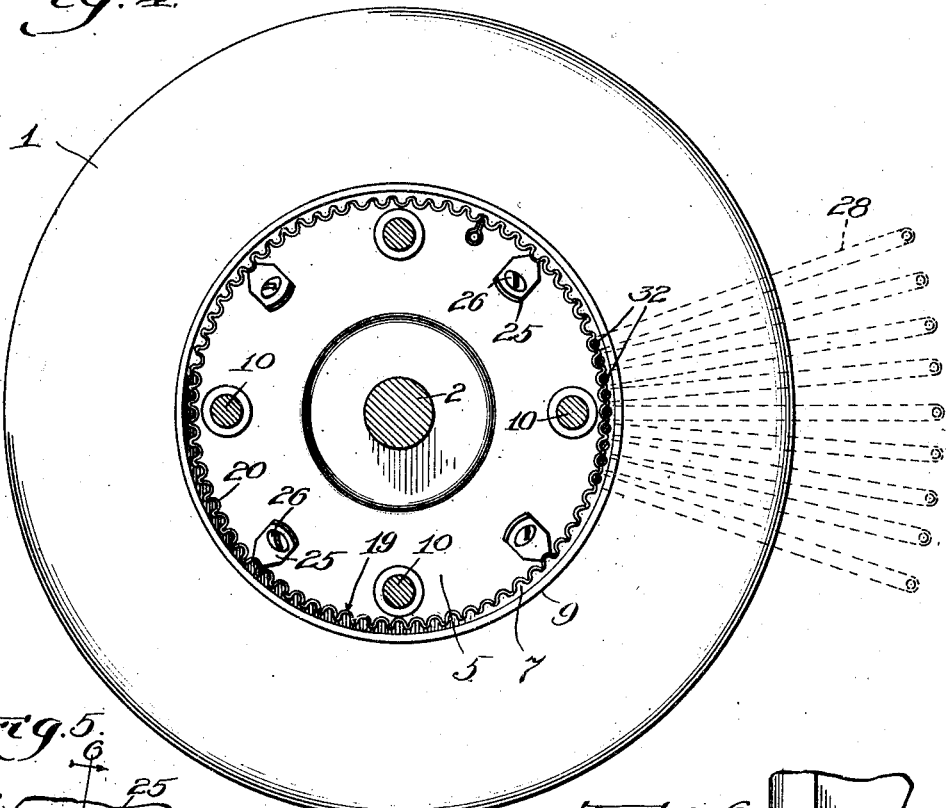
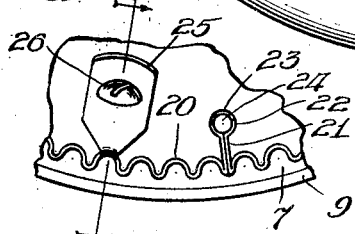
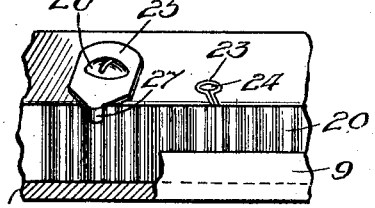
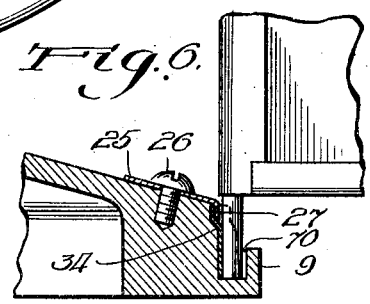
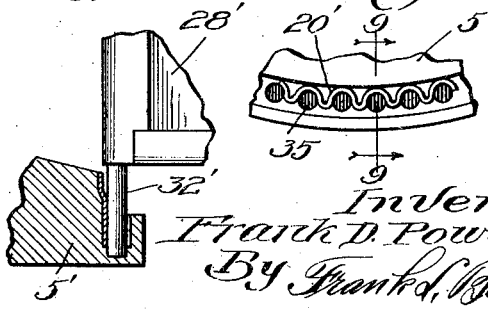
Witness:
Stephen F. Nelson
Inventor:
Frank D. Powell
By Frank L. Belknap
Atty.

Patented Jan. 20, 1931

1,789,839

UNITED STATES PATENT OFFICE

FRANK D. POWELL, OF CHICAGO, ILLINOIS, ASSIGNOR TO ACME CARD SYSTEM COMPANY, OF CHICAGO, ILLINOIS, A CORPORATION OF ILLINOIS

STAND FOR VISIBLE INDEX AND RECORD EQUIPMENT

Application filed October 17, 1929. Serial No. 400,223.

This invention relates to improvements in a stand on which is adapted to be mounted a plurality of frames, each containing visible index or record data, and in one specific embodiment comprises a revolving or rotary stand on which is detachably mounted a large number of frames each containing a plurality of index strips, record cards, or other data readily visible to the eye.

One of the objects of the present invention is to provide a stand adapted to support a plurality of index frames and characterized by the facility with which the frames may be mounted upon and removed from the stand.

Various arrangements have been proposed in stands of this general character, but in most cases the devices heretofore produced are open to numerous objections, and the improvements incorporated in the present invention have been designed to overcome these particular objectionable features.

Chief among the disadvantageous features presented in the devices of the prior art, is the inability of stands of this character to maintain the frames mounted upon the stands in a uniformly spaced relation with respect to one another, resulting in crowding of the frames at one portion of the stand, while more ample room exists at another portion of the stand. This crowded condition of the frames renders it difficult for the operator or the one seeking the information contained upon the frames, to properly view the informatory matter, inasmuch as the arc through which the frames may rotate is considerably diminished. Due to the operator's inability to properly view the index matter, the natural tendency is to attempt to increase by force the angular position occupied by the frames in question, resulting in bending the frames, bending and ultimately breaking the pintles upon which the frames rotate, and the breaking of the dividing pins disposed in the slot in which the pintles are positioned.

To obviate this disadvantageous feature I provide a pair of spaced annular grooves when a rotatable stand is to be utilized, or a pair of non-annular spaced grooves where a longitudinal stand is desired, one or both peripheral edges of each of the grooves being corrugated or scalloped, and one pintle of each frame being adapted to be retained and journaled in the indentations of the scalloped or corrugated edge. In this manner, each frame is positioned a uniformly fixed distance from its neighboring frame, thereby eliminating any possibility of crowding of the frames with accompanying destructive consequences.

Briefly referred to, my invention comprises, when a rotatable stand is desired, a base of comparatively heavy material, a vertically disposed shaft, and a pair or series of pairs of spaced plates mounted upon said shaft, one being superposed above the other. A circular groove or slot may be provided adjacent the edge of each plate and as a feature of my invention I may dispose a corrugated or scalloped ring in the slot adjacent one defining edge of the same. For the sake of flexibility and accessibility this ring may be removably mounted within the slots by a means to be hereinafter more fully described. My invention in its broadest concept contemplates the disposition of said ring adjacent either the inner or outer wall of each slot, or if desired, two rings may be utilized, one adjacent each wall of each slot.

Although in a preferred embodiment my invention may assume the form of a rotatable stand having one or more tiers of rotatable index units, it is to be understood that it is not intended to limit the scope of the invention thereto, since any form of index stand, rotatable, stationary, circular or straight is intended to be within the purview of the invention.

Another important object of the present invention resides in the novel means of mounting and securing the corrugated or scalloped ring in the aforementioned circular or annular slot. The ring may take the form of a metal strip which has been corrugated or more strictly speaking, scalloped, transversely of its length. Each end of the strip may be bent backwardly from a point of an end scallop and then bent arcuately. Thus two symmetrical abutting ends are formed. The plate in which the annular slot is formed may be provided with a slit or groove opening at one end into the slot and terminating at the other end in a circular sectioned aperture. Into this slit and aperture the abutting ends of the scalloped ring are adapted to fit and are tightly held therein by inserting a pin or the like into the circular sectioned aperture thereby firmly locking the arcuate portions of said ends therein. In addition, a plurality of lugs may be removably mounted adjacent the annular slot. Each lug may be provided with an overhanging finger shaped in such a manner as to conform to the curvature of one of the scallops, the scallop being indented at that point so as to permit the surface of the finger to be flush with the curved surface of the scallop.

Thus it can be readily seen that the uniformly indented ring is readily demountable and may very quickly and conveniently be mounted or changed. It is to be understood, of course, that other means may be used for mounting the ring in the slot, such as welding or soldering, and such means is also contemplated in the present invention.

Various other objects, features and advantages will be hereinafter more particularly brought out.

In the drawings:

Fig. 4 is a sectional view taken on the line 4—4 of Fig. 1 and looking in the direction indicated by the arrows.

Fig. 5 is a fragmentary plan view of a portion of the lower revolving plate illustrating the means for mounting the corrugated ring in the slot.

Fig. 6 is a fragmentary side sectional view illustrating the disposition of an index frame pintle in one of the scallops.

Fig. 7 is a fragmentary front elevational view of the ring as shown in Fig. 5, parts being broken away.

Fig. 8 is a fragmentary plan view of a portion of the revolving plate showing a slight modification of the invention.

Fig. 9 is a sectional view taken on the line 9—9 of Fig. 8.

Figure 2:
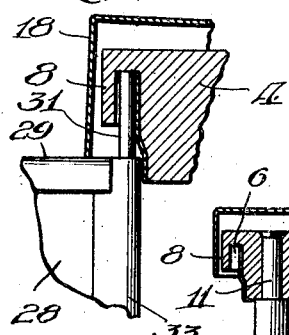
Fig. 2 is an enlarged fragmentary sectional view illustrating the position of the movable plate moved upwardly in the insertion of an index frame.

Referring more in detail to the drawings, 1 indicates generally a base or spreading support from the center of which projects upwardly a shaft 2 adapted to support a stand designated as a whole at 3. Although but one stand is shown in the drawings, it is to be understood that a plurality of such stands may be mounted on the same shaft if desired, one above the other.

In the drawings, the stand is illustrated as being of the revolving type. It is to be understood, of course, that the improvement which forms the basis of the present invention is equally applicable to non-revolving stands.

The stand 3 may comprise upper and lower discs 4 and 5 provided, respectively, with annular grooves 6 and 7 confined by walls 8 and 9 respectively. A plurality of rods 10 connect the upper disc 4 to the lower disc 5 by means of screws or the like 11 thereby forming a unitary revolving structure in which the two discs are spaced the desired distance from each other. To facilitate rotation of the structure 3 a ball bearing assembly 12 may be provided.

A plurality of apertures 13 may be provided in the upper disc 4 into which may be inserted elongated pins or bolts 14. A movable plate 15 is illustrated as being supported on the upper edge of the upper disc 4, provided adjacent its outer edge with apertures into which are adapted to be inserted the pins 14 which latter, having enlarged heads, rest upon the upper surface of the movable plate 15. The operation will be described on the basis of providing the movable plate 15 on the top of the disc 4. It will be obvious that the movable plate 15 is equally applicable to the lower disc 5.

The arrangement is such that the pins 14 pass through the movable plate and through the disc 4 projecting below the latter a considerable distance. Each of the pins on its lower end may be provided with an adjustable nut which functions to hold a coil spring 17 against the lower surface of the disc 4.

The outer edge 18 of the plate 15 may project beyond the outer edge of the wall 8 of the upper disc 4 for a purpose to be hereinafter described.

As a feature of the present invention, referring particularly to Figs. 4, 5, 6 and 7, a corrugated ring 19 may be positioned in each of the slots 6 and 7 adjacent the inner walls of said slots. The ring 19 may be formed of a metal strip which has been corrugated or scalloped transversely of its length as shown at 20 in Figs. 4 and 5. Each end of the ring 19 is turned backwardly from a point of an end scallop as shown best at 21 in Fig. 5, the ends 21 terminating in arcuate portions 22. A slit may be formed in each of the disks 4 and 5 at right angles to and connecting at one end with the annular slots 6 and 7 respectively. The other end of the slit opens into a circular-sectioned aperture 23, the portions 21 and 22 of each abutting end of the ring being adapted to fit into the slit and aperture 23 respectively. To lock the members 21 and 22 in desired position, a pin 24 may be wedged in the aperture 23. Thus lateral motion of the ring is restrained within the slot and vertical motion is partially restrained. In order to prevent all vertical motion of the ring relative to the slot a plurality of lugs 25 may be removably mounted upon the discs adjacent the slots, the removable mounting comprising screws 26. A lip or finger 27 of the lug 25 extends over the slot and ring and is turned downwardly adjacent an indentation of one of the scallops 20. The indentation of the scallop over which the lip is disposed may be bent sufficiently to permit the face of the lip 27 to be flush with the curved surface of the scallop. Thus it is obvious that the ring 19 is readily mountable and removable and may be replaced by a new ring when desired or found necessary.

It is to be understood of course, that other means of retaining the ring in the slot are contemplated by the invention in its broadest aspect, such as, for example, soldering or welding the ring in place.

Figure 3:
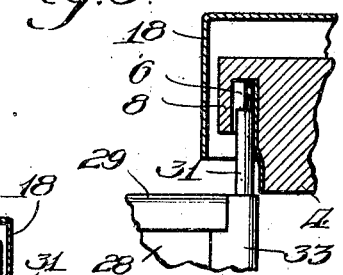
Fig. 3 is a similar enlarged fragmentary sectional view showing the relative positions of the index frame, stand frame, and movable plate in normal positions.

In the utilization of the invention, an index frame 28 having an upper edge 29, a lower edge 30, an upper pintle 31 and a lower pintle 32 is adapted to be mounted on the stand. The pintles 31 and 32 may be inserted into the upper and lower slots 6 and 7, respectively, and as is obvious are journaled in the scallops 20. Assume that it is desired to mount an index frame 28 on the stand. The upper pintle 31 is inserted in the groove 6 below the overhanging edge 18 of the plate 15. Referring particularly to Figs. 2 and 3, it can be readily seen that the lower end of the scalloped ring 19 extends below the edge 18 and thereby serves as a guide to the operator in inserting the upper pintle 31 into the slot 6. Pressure is applied to the frame, for instance, by hand, to force the pintle 31 upwardly to the point where the top edge of said pintle abuts against the top wall of the groove 6. Durig this upward movement of the pintle, the upper edge 29 of the frame has made contact with the overhanging edge 18 of the top of the cover plate 16, thus raising that side of the top cover plate from its normal position, the top cover plate carrying with it the pin 14 and compressing the spring 17 against the lower surface of the disc 4. When the pintle 31 has made contact with the closed upper wall of the groove 6, the lower edge of the lower pintle 32 will have room enough to clear the upper edge of the wall 9 defining groove 7, thus permitting said lower pintle 32 to be inserted in the groove 7 and into one of the scallops 20.

The frame is then moved or permitted to move downwardly until the lower edge of the lower pintle 32 rests in the lower portion of the lower groove 7, whereupon the plate 15 under the influence of the spring 17, will also be restored to normal position. The frame at this point will occupy the position illustrated very clearly in Fig. 1.

To provide clearance for the edge 33 of the frame 28, thereby shortening the length of pintles 31 and 32 and hence strengthen the frame structure and make the same more compact, the corrugated ring 19 may be offset longitudinally as shown at 34 in Fig. 6. Hence, only the ends of the pintles 31 and 32 are in contact with the ring, permitting the frame 28 to swing freely clear of the discs 4 and 5. In this manner the offset portions of the ring 19 merely serve as guides when inserting the pintles in their proper positions.

Figure 1:
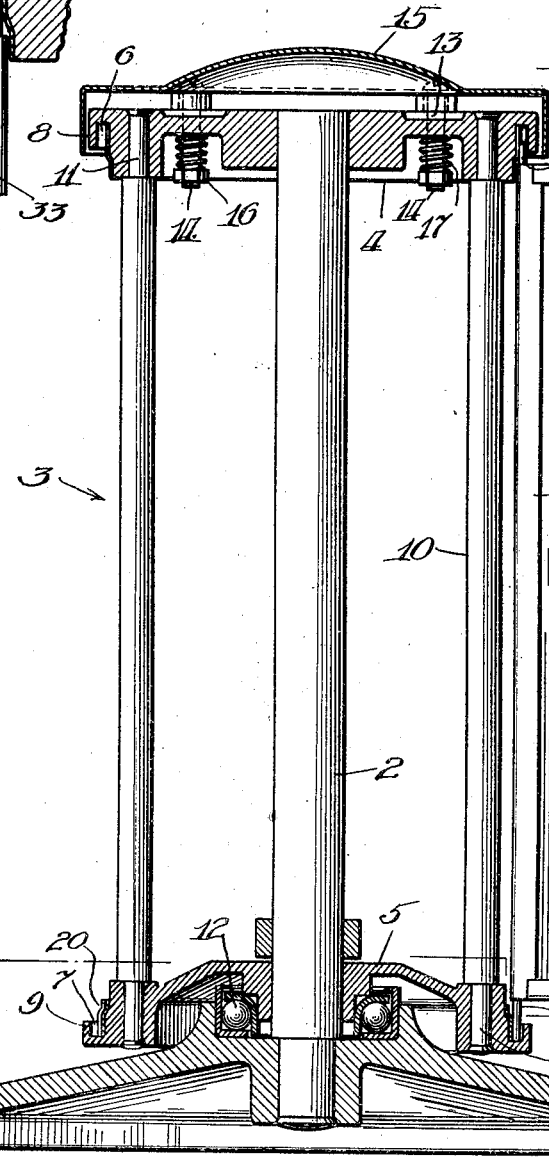
Fig. 1 is a sectional elevation of a revolving type of stand equipped with the improvement of the present invention.

A slight modification of the invention is shown in Figs. 8 and 9 wherein a portion of the disc 5' is provided with an opening or aperture 35 at the foot of each scallop 20' in which the pintle 32' of the frame 28' may rest when the frame is in normal position. The provision of the apertures 35 may be utilized both in the upper and lower discs 4 and 5, as is obvious. In this case the walls 8 and 9 as shown in Fig. 1 may be eliminated if desired.

It is apparent that I have devised a stand for index frames or the like constructed to facilitate the mounting and removing of the frames from the stand, means being provided to uniformly space the frames one from the other, avoiding crowding of the frames, and thereby rendering the informatory matter disposed upon the frames clearly visible under all conditions. In addition, the device is sturdy, rugged, extremely flexible of use and comparatively economical to manufacture.

I am aware that many modifications in details of construction may be made without departing from the spirit of the invention, the broad concept to be covered herein comprising an index stand adapted to support a plurality of index frames, each index frame being removable but non-slidably mounted with respect to the stand.

While I have illustrated and described the ring 19 as taking the form of a metal strip bent to bring the ends thereof together, it is to be understood that I do not wish to be limited to a metal strip since the invention contemplates the use of a cast metal ring or a ring made of non-metallic material such as bakelite, hard rubber or similar materials.

I claim as my invention:

1. In combination, a stand for removably supporting a plurality of index frames, comprising spaced upper and lower supports and means for uniformly spacing a plurality of index frames between said supports, comprising a scalloped ring disposed upon each support.

2. An index stand, including in combination spaced upper and lower supports provided with inwardly facing opposed grooves, a scalloped ring removably positioned in each groove for retaining a plurality of index frames in spaced relation with respect to each other.

3. In an index stand for removably supporting a plurality of index frames, spaced upper and lower supports provided with inwardly facing opposed grooves, a scalloped ring removably disposed in each groove, each index frame being provided with a pintle adapted to be journaled in the scallops formed in said rings.

4. In combination, a stand comprising spaced upper and lower supports provided with inwardly facing opposed grooves confined by walls, a movable plate cooperatively connected with one of said supports having an edge lying in a different plane than the body portion of said plate and projecting beyond the edge of the wall confining the groove in that support, means for maintaining said movable plate under spring tension, and means for uniformly spacing a plurality of index frames between said supports comprising a scalloped ring mounted upon each support.

5. In combination, a stand comprising spaced upper and lower supports provided with inwardly facing opposed grooves confined by walls, means for uniformly spacing a plurality of frames between said supports comprising a scalloped ring mounted upon each support, a movable plate cooperatively connected with one of said supports having an edge lying in a different plane than the body portion of said plate and projecting beyond the edge of the wall confining the groove in that support, an elongated pin passing through said plate and said support and having a portion projecting beyond the latter, a coil spring operatively disposed with respect to that portion of the pin projecting beyond said support, and means mounted upon said pin for holding said spring against a surface of said support.

6. In combination, a stand comprising spaced upper and lower supports provided with inwardly facing grooves confined by walls, a movable plate cooperatively connected with one of said supports having an edge lying in a different plane than the body portion of said plate and projecting beyond the edge of the wall confining the groove in that support, means for maintaining said movable plate under spring tension whereby when forced away from its adjacent support to permit the insertion of an element in the grooves, said plate will be positively restored to normal position, and means for uniformly spacing a plurality of said elements between said supports comprising a scalloped ring disposed upon each support.

7. In combination, a supporting device for index leaves or the like, comprising spaced apart annular grooves, a plurality of index leaves detachably engaged thereby, means for uniformly spacing said index leaves from one another comprising a scalloped member positioned upon each support, and vertically movable means to prevent the accidental disengagement of the leaves from said grooves.

8. An index stand including in combination, spaced upper and lower supports provided with inwardly facing opposed grooves, a ring positioned in each groove having a plurality of defined compartments for retaining a plurality of index frames in spaced relation with respect to each other.

In testimony whereof I affix my signature.

FRANK D. POWELL.